REMOTE CONTROL SYSTEM FOR LATTICE DISTRIBUTION NETWORK

Filed May 11, 1959 6 Sheets-Sheet 1

Inventor:
Jacques Charles Gustave Pelpel
By [signature]
Patent Agent

Feb. 21, 1961 J. C. G. PELPEL 2,972,686

REMOTE CONTROL SYSTEM FOR LATTICE DISTRIBUTION NETWORK

Filed May 11, 1959 6 Sheets-Sheet 2

Inventor:

Jacques Charles Gustave Pelpel

By [signature] Patent Agent

Inventor:

Jacques Charles Gustave Pelpel

By Eric D. Frankel

Patent Agent

REMOTE CONTROL SYSTEM FOR LATTICE DISTRIBUTION NETWORK

Filed May 11, 1959

Inventor:

Jacques Charles Gustave Pelpel

By Eric D. Mankel [signature]
Patent Agent

Inventor:
Jacques Charles Gustave Pelpel
By [signature]
Patent Agent

REMOTE CONTROL SYSTEM FOR LATTICE DISTRIBUTION NETWORK

Filed May 11, 1959 6 Sheets-Sheet 6

Inventor:

Jacques Charles Gustave Pelpel

By [illegible]

Patent Agent

United States Patent Office 2,972,686

Patented Feb. 21, 1961

2,972,686

REMOTE CONTROL SYSTEM FOR LATTICE DISTRIBUTION NETWORK

Jacques Charles Gustave Pelpel, Montrouge, France, assignor to Compagnie des Compteurs, Montrouge, France, a French company Filed May 11, 1959, Ser. No. 812,527

12 Claims. (Cl. 307—140)

The present invention relates to equipment for transmitting remote-control signals by tone frequency currents superimposed on the industrial power frequency currents of electric power distribution networks.

The principal purpose of the invention is to enable the transmission of such control signals by introducing them in series on lattice network consumer systems, i.e., closed circuit networks, in which all the points are connected to each other and to distributing bars which are supplied by transformers from a high tension system.

Devices are already known for transmitting tone frequency currents on power distribution networks, in particular to enable actuation of remote-controlled relays of street lighting systems, or control circuits for certain household equipment, or for switching multi-rate electricity meters. In the case of lattice network systems, as defined above, it has already been proposed to effect transmissions through parallel coupling, employing a coupling circuit comprising an isolation condenser and a reactance tuned to the frequency of the superimposed control currents. This arrangement has the disadvantage of causing the appearance in the primary supply system of a spurious voltage which may be considerable, thus creating the risk of interfering with other similar equipment operating on the same frequency and connected up to this same primary supply system.

In the case of radial open-ended networks, it has been proposed to couple the transmission in series by means of transformers connected to the feeder lines which run to the network and on which the transmissions of tones are to be effected to the primary supply system. In this case, the voltage in the utilization circuit is proportional to the impedance thereof and the tone voltage reflected therefrom is proportional to the apparent impedance of the primary supply network. This latter impedance being generally small in relation to the utilization-circuit impedance, the spurious voltage which appears on the interconnection network remains small, and the risk of disturbance of the adjacent networks is thus reduced accordingly. However, this arrangement is only applicable to open-ended networks which have no other connections between them than the coupling point with the principal supply network. Thus, the teaching given by this particular system is not applicable to the special case of lattice network systems.

The object of the invention thus includes providing a novel system enabling transmissions to be made by series connections in lattice network systems while, more particuarly, obviating the disadvantages stated above.

Another purpose of the invention includes connecting the equipment in such a manner that the transmission of reference signals is always synchronized in phase and frequency in all the parts of the electric network so that the various receiver relays are assured of being always properly controlled, i.e., that a power at least equal to that corresponding to their release threshold shall be supplied to them.

Still another purpose of the invention includes the provision of equipment such that the units used for synchronization and remote control transmission of reference signals shall comprise low-powered units consuming very little power.

Yet another purpose of the invention is to provide a system having utility for the transmission of control signals, regardless of the number of phases of the network or networks.

Various other advantages of the invention will also be revealed both by the description as well as the following claims, and forms of embodiments of the invention are given by way of examples, in the attached drawings.

Figure 1:
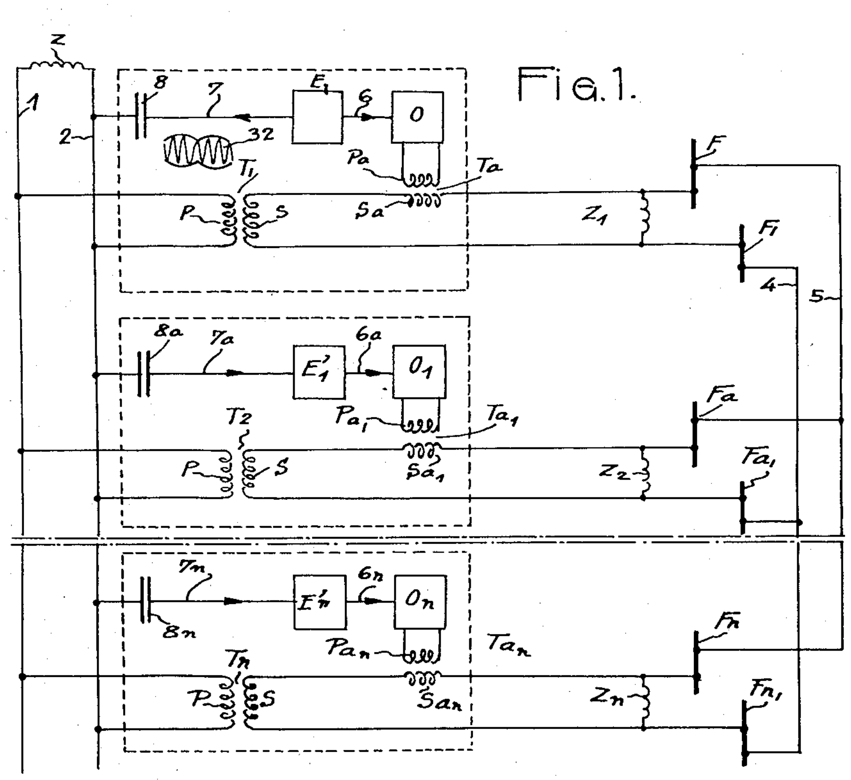
Figure 1 is a schematic diagram of an electric distribution network of the lattice or retiform type to which the equipment according to the invention is applied.

To simplify the understanding of the equipment, Figure 1 shows in the most diagrammatical manner possible the essential elements that form the system;

According to that figure, 1 and 2 designate the conductors of a high tension line. Z designates the impedance of that line which is presented to the various step-down distribution transformers which may be of any number. These transformers, which are designated by the references $T_1, T_2 \ldots T_n$, are arranged in a known manner with their primary windings P connected to each of the conductors of the high tension line.

The secondaries S of the transformers $T_1$ to $T_n$ are connected in the same way to bus bars F, $F_1$, $F_a$, $F_{a_1} \ldots F_n$, $F_{n_1}$ acting to supply a consumer network represented by two conductors 4 and 5.

As can be seen from the drawing, all the bus bars F, $F_1$, $F_a$, $F_{a_1} \ldots F_n$, $F_{n_1}$ are respectively interconnected, so that a network is obtained which will be called "retiform." This network is a distribution system provided with impedances which are represented in a diagrammatical manner and are designated by the references $Z_1$, $Z_2 \ldots Z_n$.

The mean or low tension consumer networks of the kind represented by the conductors 4, 5 often include devices that are remote-controlled, particularly by relays sensitive to tone frequency currents operative to cause closing and/or releasing.

To connect into the network circuit various equipment, it has been necessary in the past to provide each circuit coupled into the high tension line with its own means for generating and/or injecting—during a given time—currents for controlling in a compatible manner the tone receiving members which are to be activated thereby.

To this end, there is arranged in series with one output conductor of each of the secondaries S of various transformers $T_1, T_2 \ldots T_n$, the secondaries $S_a, S_{a_1} \ldots S_{a_n}$ of the transmission transformers $T_a, T_{a_1} \ldots T_{a_n}$ having primaries $P_a, P_{a_1} \ldots P_{a_n}$, supplied by driver devices O, $O_1 \ldots O_n$ whose method of operation is described hereinafter with reference to Figures 6 and 8.

For a clear understanding of the following, it has been arbitrarily assumed that the particular modulator E and the driver O comprise the transmitter serving the entire equipment. This transmitter is intended to energize the driver O as well as the other drivers $O_1 \ldots O_n$ by acting to obtain this result through the receiving units $E'_1 \ldots E'_n$.

As can be seen from the drawing, both the modulator E as well as the receiving units $E'_1 \ldots E'_n$ are respectively connected to the various drivers O, $O_1 \ldots O_n$ by the conductors 6, $6_a \ldots 6_n$. In like manner, the units E, $E'_1 \ldots E'_n$ are connected to the high tension conductors 2 by the conductors 7, $7_a \ldots 7_n$ and the isolation condensers 8, $8_a \ldots 8_n$.

This means of connecting the equipment enables the output by the unit E to activate the other units $E'_1 \ldots E'_n$ by means of high frequency carrier currents acting to synchronize the operation of all the consumer circuits of the network, which thus enables a perfect synchronization to be obtained in the remote-control tone frequency currents emitted by the various drivers O.

Figure 2:
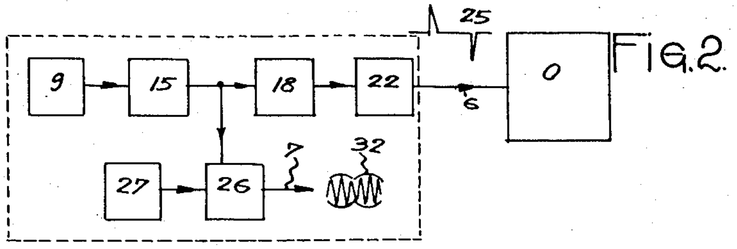
Figure 2 is a partial block diagram of a preferred embodiment of a typical transmitting device with which the equipment is provided at E in Figure 1.
Figure 4:
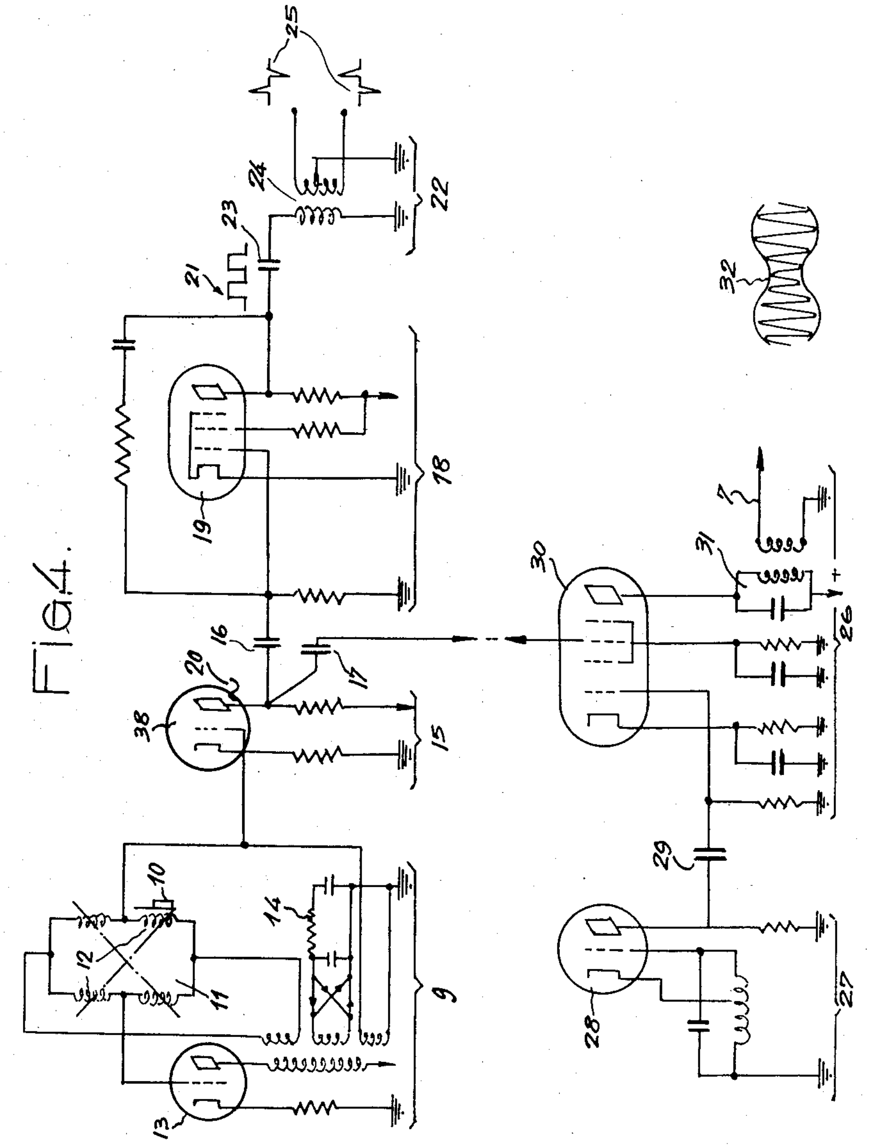
Figure 4 is a detailed schematic diagram, corresponding to the block diagram of Figure 2.

Figures 2 and 4 show one preferred embodiment of the modulator E serving to control both the driver O and the receiving units $E'_1 \ldots E'_n$, said units operating the other drivers $O_1 \ldots O_n$.

According to these figures, a stabilized oscillator 9 is used employing a vibrating reed, the circuit being shown in Figure 4, according to which the vibrating reed 10 is disposed adjacent a circuit 11 comprising coils 12 coupled in parallel and connected with a tube 13 and a rectifying bridge 14, so that the reed 10 sets up sinusoidal tone currents of a frequency equal to its natural frequency. The current thus produced is then amplified in an amplifying device 15 comprising, for example, a triode 38 connected as an amplifier.

The amplified sinusoidal tone current 20 is transmitted at the output of the amplifier 15 by condensers 16, 17 on the one hand to a pulse-forming remote-control circuit, and on the other hand to a modulating circuit for generating modulated carrier currents serving to activate and synchronize the receiving units $E'_1$, $E' \ldots E'_n$.

The circuit forming remote-control pulses comprises, in the first place, a clipper unit 18, preferably formed by a vacuum tube, such as a pentode 19 which is connected in a negative feedback circuit and converts the sinusoidal current coming from the amplifier 15 and shown diagrammatically at 20 into rectangular electric signals, as shown at 21 in Figure 4.

These rectangular signals 21 are transmitted to the input of a differentiating circuit 22. This circuit comprises, for example, as shown in Figure 4, a condenser 23 connected with the primary of a transformer 24 of which the center tap of the secondary is grounded. This differentiating circuit is intended to convert the rectangular signals 21 by conversion into steep-front pulses 25, determining the transmission frequency of driver O.

$O_1 \ldots O_n$ after having been utilized as described hereinafter with reference to Figures 6 and 8.

As already explained above, the sinusoidal voltage coming from the amplifier 15 is also applied to a modulating circuit designated in its entirety by the reference 26 in Figures 2 and 4. This modulating circuit is associated with a high frequency generator 27 forming a carrier wave for the modulation tone in the modulating circuit 26.

As shown in Figure 4, the high frequency generator 27 is advantageously formed by a triode 28 connected as a transmitter, and connected by a condenser 29 to the modulating circuit which can be formed in different ways, but which advantageously comprises a pentode 30 whose output electrode connects with a filter 31 from which the modulated high frequency currrent comes, as shown at 32.

By adjusting the filter 31 in a suitable manner, it is possible to select one modulated high frequency component which, according to the method of transmission sought for the reference frequency, can be, for example, a single sideband.

Figure 3:
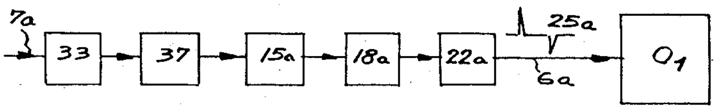
Figure 3 is a block diagram illustrating a preferred embodiment of a receiving unit $E_1$ for signals emitted by the transmitting device according to Figure 2.
Figure 5:
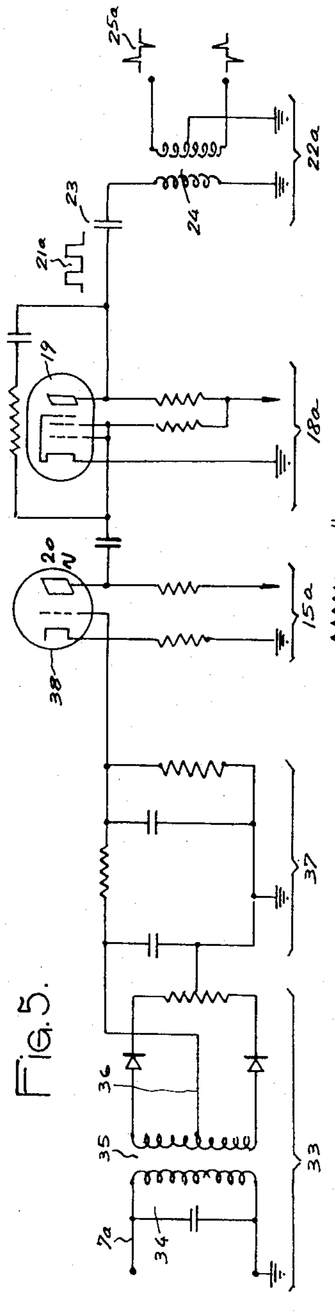
Figure 5 is a detailed schematic diagram, corresponding to the block diagram of Figure 3.

Figures 3 and 5 show the components of each of the various receiving units $E'_1 \ldots E'_n$, which are intended to receive the modulated high frequency current which is transmitted to them via condenser 8 from the unit E through the isolation condenser $8_a \ldots 8_n$ and the high tension lines 1, 2. These components comprise, in the first place, a demodulating circuit 33 comprising, as shown in Figure 5, a tuned circuit 34 connected by a transformer 35 to a rectifying bridge 36 which is associated with a filter designated in its entirety by 37.

The values of the capacities and resistances of the demodulating circuit are selected as to eliminate the carrier frequency and recover the modulation frequency. Moreover, the filter 37 is tuned to the modulation frequency so as to allow only the tone frequency to pass coming from the oscillator 9 of Figure 4.

The filtered voltage coming from the filter 37 is thus of the same frequency and the same phase as the alternating voltage which is applied to the input of the amplifier 15 described above. This feature enables the voltage coming from the filter 37 to be utilized so as to apply it to the grid of a triode 38 forming an amplifier 15*a* similar to the amplifier 15 of the modulator unit E.

As described above with reference to this modulator E, the receiving units $E'_1 \ldots E'_n$ comprise, like said modulator E, a pulse-forming circuit comprising a clipper 18*a* for forming rectangular signals 21*a* and a differentiating circuit 22*a* supplying pulses 25*a* identical with the pulses 25 described above.

As will be seen from the foregoing, both the modulation transmitter E as well as the receiving units $E'_1 \ldots E'_n$ comprise similar units formed by the various circuits placed beyond the amplifiers 15 and 15*a*, respectively. Moreover, these units are low power units so that their consumption is not very great.

Figure 6:
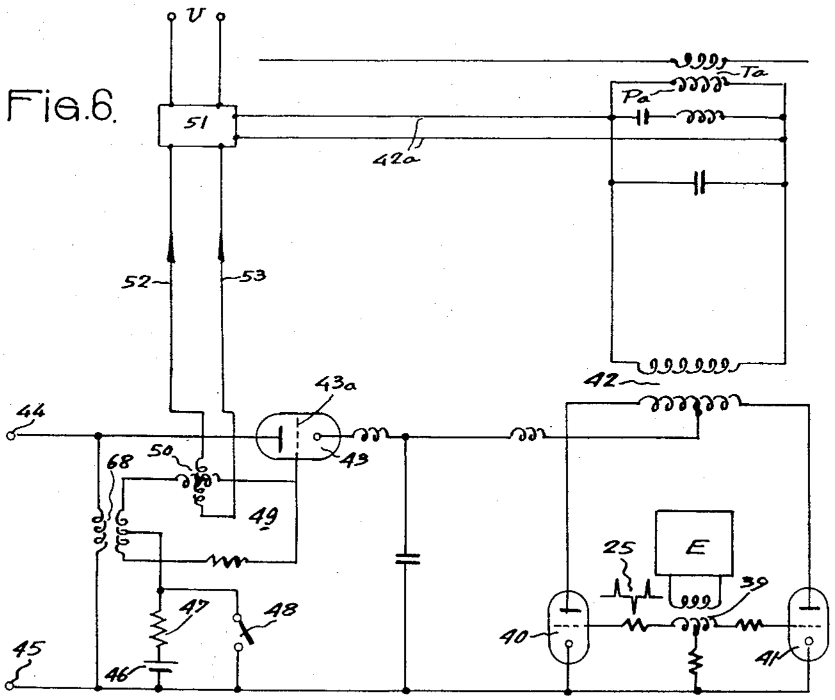
Figure 6 is a schematic diagram showing a modulator and driver device employed to inject into the lattice or retiform network system of distribution remote-control tone frequency currents, this device being itself controlled by the transmitter device of Figures 2 and 4 and/or by the receiver of Figures 3 and 5, according to the position it occupies in the network.

The steep-front pulses 25, 25*a*, synchronized in phase and frequency, are directly utilized for controlling each of the transmitter drivers O, $O_1 \ldots O_n$, said drivers, advantageously, being made as shown in Figure 6.

The steep-front pulses 25 are transmitted, for example, by the modulation transmitter E and the differentiating circuit 22 by means of a transformer 39 to the grids of two gas tubes 40, 41 of high power which are connected as drivers and whose plates are connected to the terminals of the primary of a first transformer 42 whose secondary feeds the primary $P_a$ of the transformer $T_a$ (Figures 1 and 6).

The center tap of the primary of the transformer 42 is fed by a tube rectifier 42, the output of which is controlled by its grid 43*a*. The rectifier 43 formed, for example, by a gas tube similar to the tubes 40, 41, which may be thyratrons, is fed from a low voltage alternating source whose terminals are designated by the references 44, 45. The grid 43a of the rectifier 43 is negatively biased by a direct voltage source 46 to which it is connected by means of a resistance 47, and which can be shunted by means of a switch 48. Moreover, the circuit of the grid 43a comprises a phase control bridge 49 comprising control reactance coils 50 intended to introduce a variable reactance into the circuit. These reactance coils are of the saturable type which can be regulated so as to modify the magnitude of the reactance in series with the grid 43a.

In Figure 6 a device 51 is shown which is used to compare the output voltage of the driver taken from the circuit of the transformer 42 with a circuit 42a having a reference voltage of given magnitude U.

This device 51 is connected by conductors 52, 53 to the saturable coils for modifying the reactance introduced into the circuit of the grid 43a. This has the effect of enabling the saturation of the reactance coils 50 to be regulated and, hence, the regulation of the reactance resulting therefrom.

Figures 7, 9:
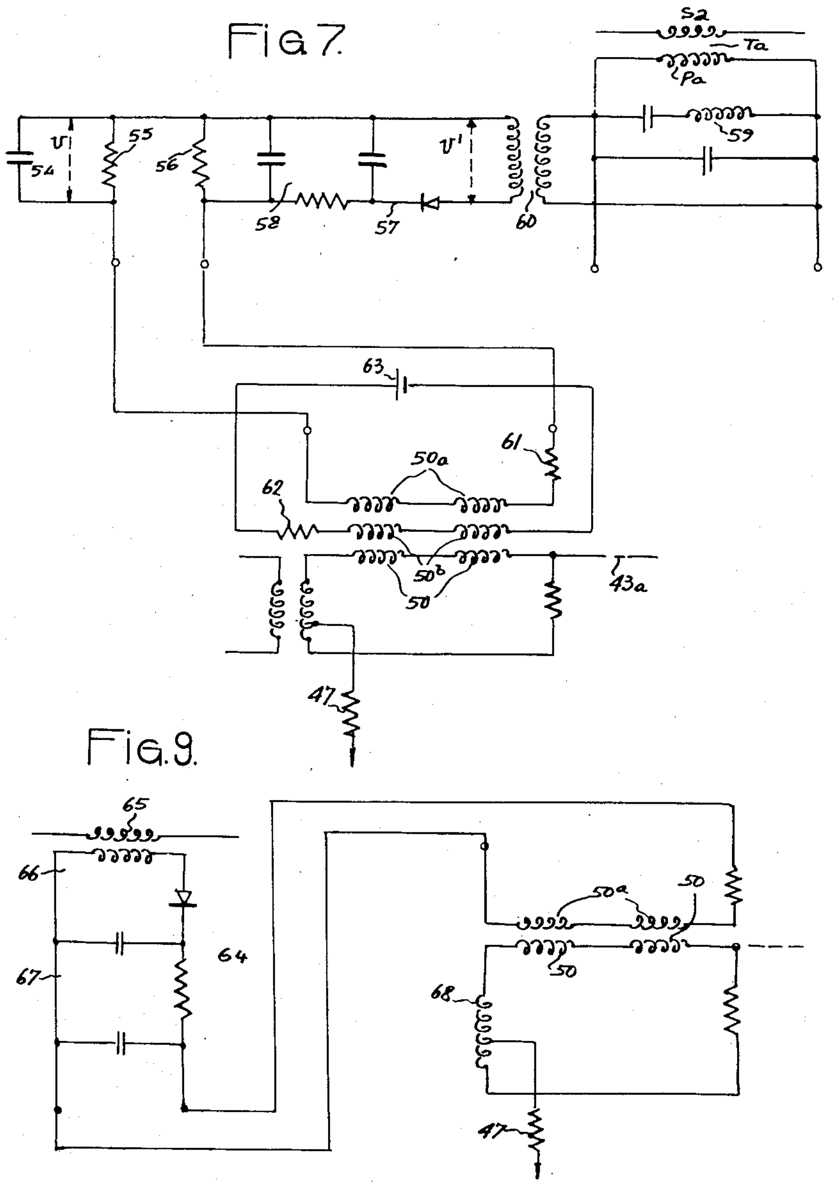
Figure 7 is a schematic diagram illustrating a detailed embodiment of one of the regulating elements shown in Figure 6.
Figure 9 is a schematic diagram of a detailed embodiment of one of the elements shown in Figure 8.

Figure 7 shows in greater detail the comparison device 51. A source 54 of the voltage U is connected to the terminals of a resistance 55 and in opposition with a direct voltage supplied to the terminals of a resistance 56 by a rectifier 57 coupled through a filtering circuit 58. The rectifying circuit 57 and filtering circuit 58 are intended to set up a direct voltage, in proportion to the alternating voltage applied to the terminals of the primary $P_a$ of the transformer $T_a$ coupling the output from the driver O, this alternating voltage being applied by a filtering circuit 59 to the primary of a transformer 60 whose secondary is connected to the rectifying circuit 57. The two opposed direct voltages, U for the reference voltage and U′ for the voltage of the driver, are applied by means of a resistance 61, as shown in Figure 7, to the inputs of saturable coils 50a comprising the unit 51 of Figure 6, intended to introduce a variable reactance into the circuit of the grid 43a. The reactance coils 50 are controlled in this manner by the differential voltage resulting from putting the reference voltage U into opposition with respect to the reference voltage U′. Since it may happen that the voltages U and U′ are equal, it is necessary that the grid 43a is also biased. For this reason, bias coils 50b are provided which are fed by means of a resistance 62 from a direct current source 63.

As will be easily understood, the operation of the driver O, described above, is as follows:

The pulses 25 coming from the differentiating circuit 22 of Figure 4, the frequency of which is stabilized and is different from the frequency of the network, control, by means of the transformer 39 (Figure 6), the grids of the gas tubes 40, 41 and thus determine the frequency of the driver. The determination of whether the remote control pulses are transmitted by the transformer 42 to the transformer $T_a$, as well as the regulation of the alternating output voltage, is accomplished by means of controlling the application of direct voltage to the plates of the gas tubes 40, 41 from the rectifier 43.

To produce an emission of remote-control pulses, it is only necessary to overcome the negative polarizing voltage on the grid 43a of the rectifier 43, which is done by closing the switch 48 shunting the direct voltage bias source 46 as well as the resistance 47. Thus, it will be seen that the direct voltage on the plates of the tubes 40, 41 of the driver can be either applied or removed without the provision of switching devices controlled by electromagnets to cause the emission of remote-control pulses.

Figure 8:
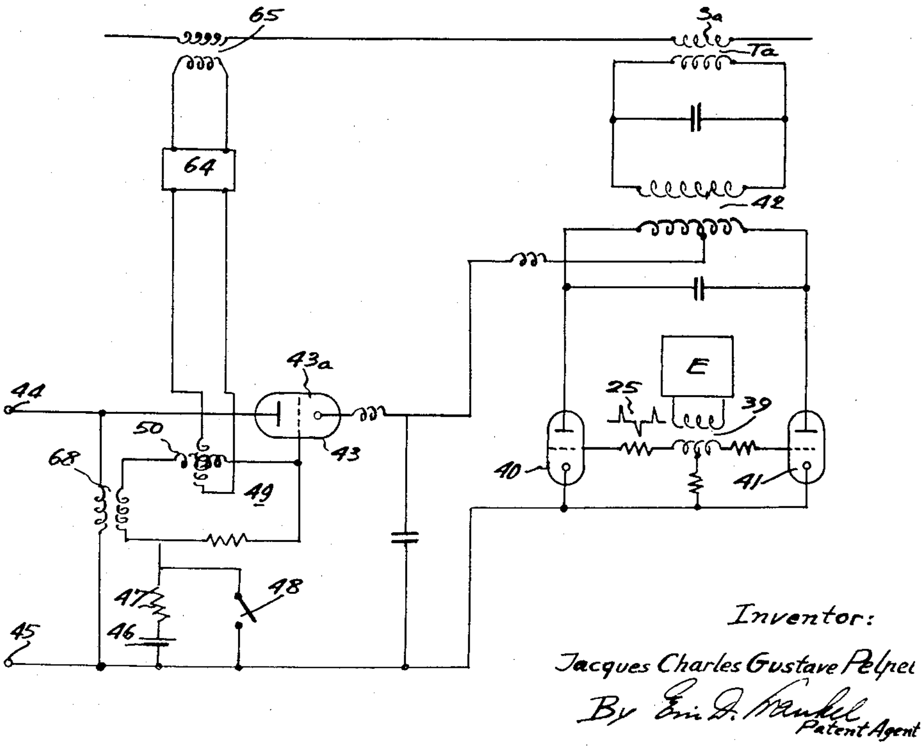
Figure 8 is a schematic diagram similar to Figure 6, showing an alternative embodiment.

Figure 8 illustrates an alternative embodiment of the driver device in which the same reference numerals designate the same members as those shown in Figure 6. The difference between Figure 6 and Figure 8 lies in that the comparison device 51 of Figure 6, enabling the voltage U′ of the driver to be compared with the reference voltage U, has been eliminated, it being replaced by a device 64 which is connected by means of a transformer 65 to the main feeder line which is in series with the secondary $S_a$ of the transformer $T_a$ for injecting remote-control pulses.

Figure 9 shows the device 64 comprising a rectifying bridge 66 delivering direct current proportional to the load current of the line. This direct current is filtered at 67 and is applied to the input terminals of the saturation coils 50a of the reactance unit 50.

This method of regulating the driver enables the amplitude of its output voltage to be regulated in proportion to the load of the network to which it is related. Actually, the device 64 of Figures 8 and 9 controls the output voltage of the driver so as to adjust the direct voltage supplied thereto by the rectifier 43 by controlling the saturation of the reactance coil unit 50 in the phasing bridge 49, depending upon the instantaneous load conditions existing on the network which has the effect of automatically regulating the bias on the grid 43a of said rectifier 43.

Considering the design of Figures 6 and 7, it will be seen from the foregoing that, if the output voltage of the driver deviates from the given comparison voltage value, it follows that when there is a load variation in the power distribution network, or a change of voltage in the network, the saturation current of the reactance 50 is modified, and by regulating the phasing of the alternating voltage applied to the grid of the rectifier by the transformer 68, the direct voltage on the plates of the tubes 40, 41 of the driver is changed which, consequently, produces a correction of the alternating output voltage.

The second method of regulating, which is shown in Figures 8 and 9, enables automatic control on the output voltage of the driver because it is effected by controlling the saturation of the reactance 50 in relation to the load current in the line. Since the device 64 supplies a direct current proportional to the load current of the line, it saturates the reactance in proportion to this current and then controls as before the direct voltage supplied to the plates of the tubes 40, 41 of the driver and, thus, controls the output voltage of the latter. This means that when there is a great load variation, the output voltage is regulated to permit only slight fluctuations on the network system controlled.

In the foregoing, a description has only been given of the driver device O which is associated with the modulation transmitter E. The other driver devices, namely, the devices $O_1$ . . . $O_n$ are identical and, hence, have not been described in detail.

It is important to consider that the invention applies exclusively to lattice-type power networks and, consequently, that the transmissions of remote control currents must be perfectly synchronized both in frequency and in phase. Actually, if this were not so, the low voltage consumer circuit 4, 5, energized by the remote-control current transmitted by one of the stations, the transformer $T_a$ for example, would be likely to flow across the secondaries S of the transformers $T_2$, $T_{a_1}$ or $T_n$ . . . $T_{a_n}$ without passing through the impedances $Z_2$ and $Z_n$ which represent the consumer devices of the low tension network 4, 5.

This risk exists due to the low value of the impedance at the inputs of these lines, i.e., essentially the impedance belonging to the lines and transformers $T_{a_1}$, $T_2$ and/or $T_{a_n}$, $T_n$. In actual practice, this leads to a phenomenon which is equivalent to a short circuit across the remote-controlled equipment, and on this account, the remote-controlled receiving relays forming part of the impedances $Z_2$, $Z_n$ are not traversed by current at the remote-control frequency which prevents their excitation and control.

By employing the present system, this disadvantage is avoided because the transmissions to all the stations through the transformers $T_a$, $T_{a_1}$ . . . $T_{a_n}$ are perfectly synchronized in frequency and in phase. This is due to the utilization of the driver transmitter E which controls the receiving units $E'_1$ . . . $E'_n$ controlling, in their turn, the drivers which supply the remote-control current.

Actually, the remote-control frequency is a function solely of the stabilized oscillator 9 of Figures 2 and 4 and this oscillator supplies both the triggering pulses 25 determining the transmission frequency of the driver O and the reference frequency which modulates the high frequency carrier current coming from the generator 27. This modulated current is applied by the isolating condenser 8, the high tension network 1, 2 and the condensers $8_a$ . . . $8_n$ at the receiving units $E'_1$ . . . $E'_n$. In the latter units, the high frequency carrier is eliminated by the demodulating circuits 33 (Figures 3 and 5) and the reference frequency synchronization signal is thus restored at the output, so that it is converted into triggering pulses 25*a* in the forming circuits 18*a*, 22*a* which apply them to the drivers $O_1$ . . . $O_n$.

As will be seen from the foregoing, the transmission of the high frequency carrier signal which is modulated by the reference frequency synchronizes the transmission of the remote-control signals on lattice networks by the drivers $O_1$ . . . $O_n$ in frequency and phase with that of the transmitter E. In actual practice, it was observed that it was advantageous to emit a high frequency carrier current a few moments before the emission of the reference frequency, so that the detection by the receiving elements $E'_1$ . . . $E'_n$ of the high frequency signal enables the preheating of the drivers $O_1$ . . . $O_n$ to be ensured.

Figure 10:
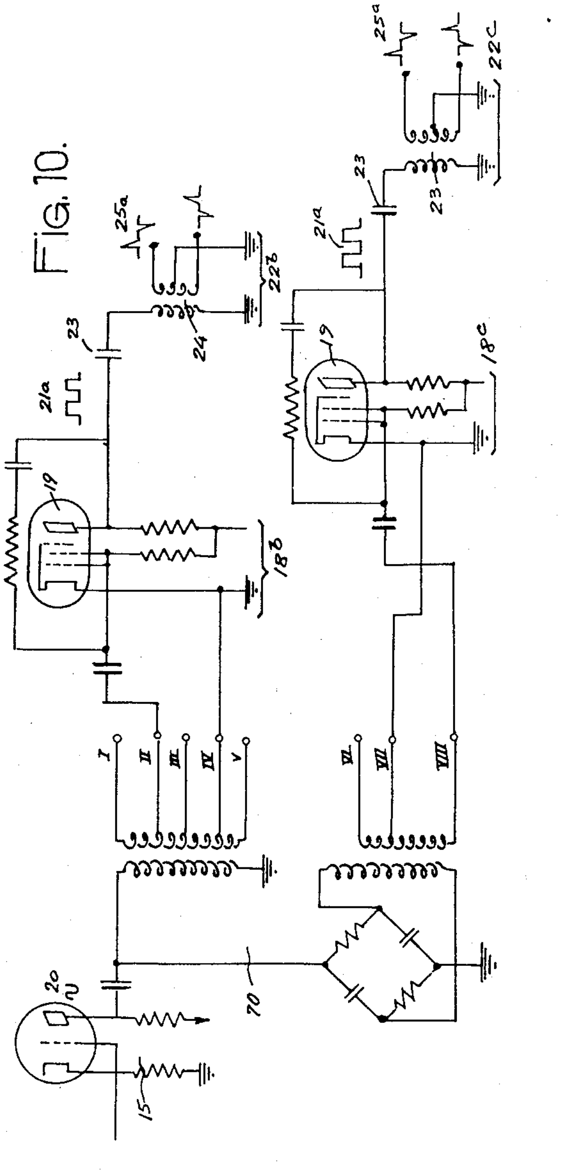
Figure 10 is a schematic diagram of an adaptor for adapting the present system for use in multi-phased networks.

In the foregoing, systems have been described for applying the invention to a monophased lattice network. The invention can be put into operation in a similar manner in case of multiphase networks. In this case, it is advantageous to proceed as shown in Figure 10, i.e., at the output of the amplifier 15, which may be located either in the transmitter E or in the receiving elements $E'_1$ . . . $E'_n$, a phasing bridge 70 is utilized formed, in the example shown, by a Scott transformer whose multiple outputs are respectively designated by the references I to VIII.

It is quite obvious that it is necessary to utilize as many drivers O as there are phases in the network to be supplied. Moreover, to obtain perfect operation, as many forming circuits 18, 22 are utilized as there are phases, i.e., it is the sine wave 20 coming from the amplifier 15 which is applied to the phasing bridge 70, at the outputs of which the phased sinusoidal signals are suitably shaped before being transmitted to the various drivers O.

By way of example, in the case of a monophase network, the point IV is grounded and, simultaneously, connected to a pulse-forming circuit $18_b$, $22_b$ which is also connected to the point II. In the case of a two-phase network, the same connecting is carried out and, moreover, a second forming circuit $18_c$, $22_c$ is used which is connected to the points VII and VIII, the point VII being also grounded. As in the case of the forming circuit, previously described, the forming circuit $18_c$, $22_c$ is connected to a driver O.

For three-phase networks, three forming circuits and three drivers are used and, in this case, a linkage is made between the points III and VI, whereas the point VII which forms the neutral is grounded, the three forming circuits and, hence, the three drivers being respectively connected to the points I, V and VIII.

Although in the majority of cases, it has been considered advisable to proceed as described above, by utilizing high frequency carrier currents for synchronizing sensitive receivers to the transmitter, it is possible to effect the synchronization sought for by different means and, in particular, by means of radio-linkages or by interconnecting cables.

Figure 11:
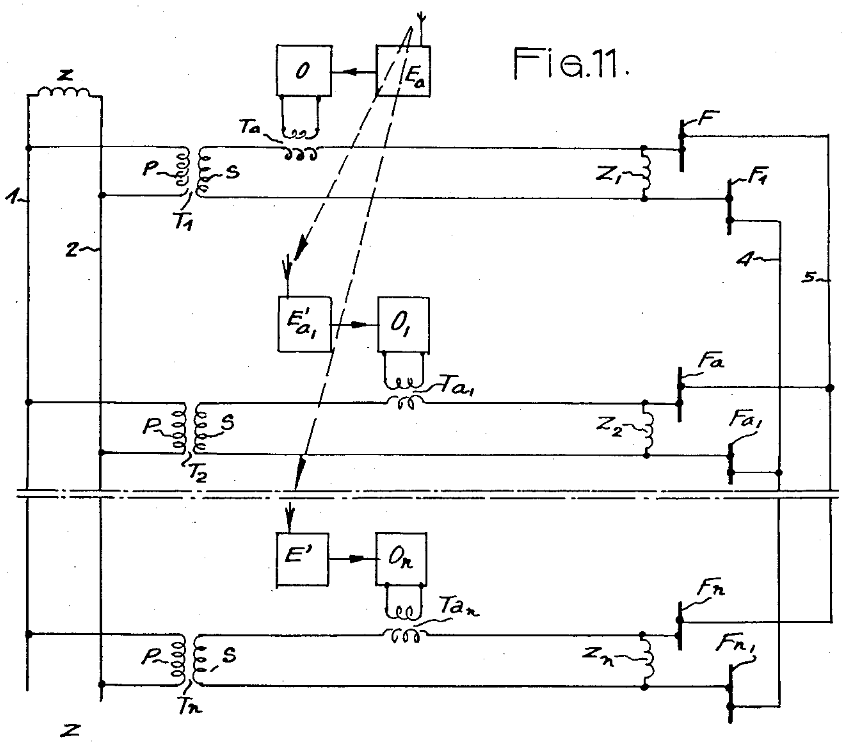
Figures 11 and 12 are diagrams similar to Figure 1, showing two alternative embodiments.

Figure 11 illustrates a modification according to which the synchronization is effected by a radiated-wave linkage. In this figure, corresponding members to those described with reference to Figure 1 are designated by the same reference numerals. Only the design of the transmitter $E_a$ and the receiving elements $E'_{a1}$ . . . $E'_{an}$ are different. Actually, the remote-control frequency set up by the oscillator 9 of Figure 4 is generally too low to be directly transmitted by radiated means. Consequently, this frequency is utilized for modulating a radio frequency carrier wave and the transmission of the reference frequency then takes place in the known manner by antenna radiation, as diagrammatically shown by the arrows in Figure 11.

It will be easily understood that the working of an equipment of this kind is absolutely the same as that described above with reference to Figures 1 to 10.

Figure 12:
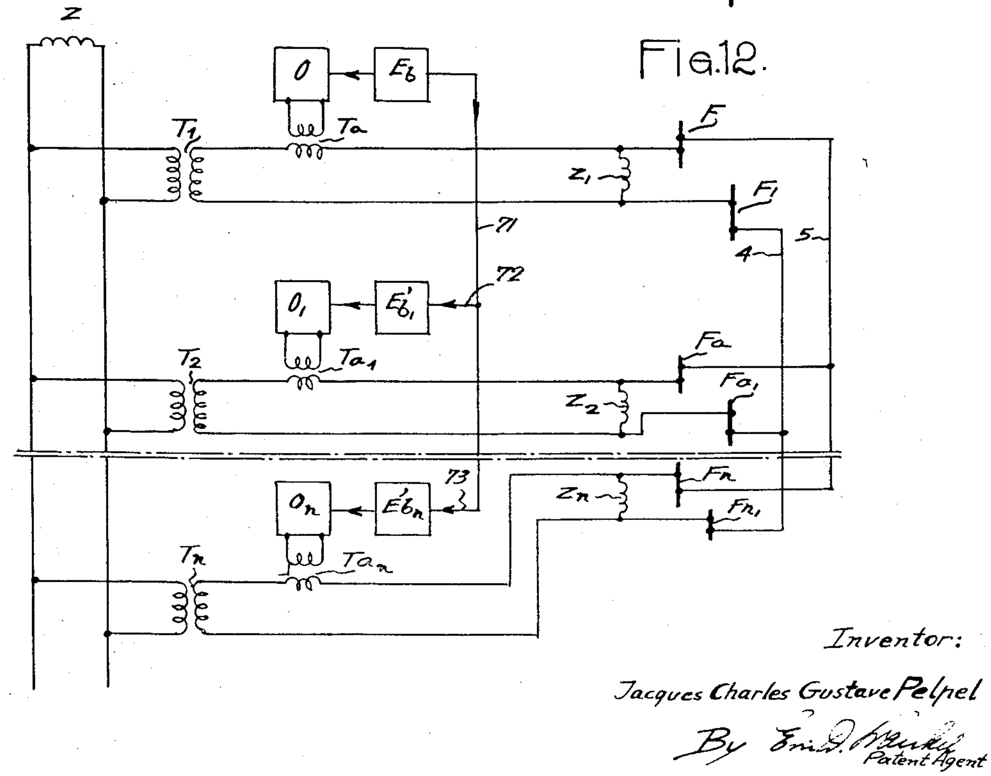

In Figure 12, a diagram is shown of a transmission equipment with synchronization by interconnecting cables. In this design, the synchronization between the pilot transmitting station $E_b$ and the receiving stations is effected by means of conductors 71, 72, 73. The conductor 71 is connected to the output of a high frequency modulating device identical with the device 26, described with reference to Figures 2 and 4, so that the modulated high frequency in the transmitter $E_b$ is transmitted by the conductors 72, 73 to the receiving elements $E'_{b1}$ . . . $E'_{bn}$.

It is possible, if necessary, that the transmission need not be effected by a carrier frequency, more particularly, in the case of circuits involving relatively short distances, where the transmission of the synchronizing pulses or sine waves can be carried out in a direct manner.

In the case of a transmission by carrier currents, as described with reference to Figures 1 to 10, the same elements as those described in connection with Figures 2 to 4, on the one hand, and Figures 3 to 5, on the other, can be utilized. However, it may be advantageous to eliminate filter 37 which is located in the receiving elements, formed as shown in Figures 3 and 5, because then the risk of interference, due to parasite frequencies, is greatly reduced, since coupling is ensured by individual conductors instead of being carried out by carrier currents in the power network, as is the case in Figure 1.

It is obvious that various modifications can be applied to the equipment described above and, more particularly, it is possible to consider that the remote-control synchronizing reference frequency may be generated by rotatory units, such as alternators replacing the driver devices O, $O_1$, $O_n$.

I claim:

1. In an electric lattice network including at least one high tension line, step-down transformers with their primary coils connected to the high tension line, groups of supply bars having at least two bars in each group connected to respective secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal generating means, signal driver and propagating means connected in series in each of the meshes of the distribution network on the secondary side of each step-down transformer, a controlling circuit associated with each driver means and connected with a receiver means for controlling the propagation of remote-control signals in the associated mesh in response to received signals for synchronizing in frequency and phase all the remote-control signals propagated by the respective driver means, said generating means being associated with one of the controlling circuits and the transmitter means being coupled to the generating means to transmit a control signal reference frequency to all receiver means coupled respectively to the other controlling circuits for receiving and locally propagating the remote-control signals synchronized with the reference frequency coming from the transmitter means.

2. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal generating means, signal driver and propagating means connected in series in each of the meshes of the distribution network on the secondary side of each step-down transformer, a controlling circuit associated with each driver means and connected with a receiver means for controlling the propagation of remote-control signals in the associated mesh in response to received signals for synchronizing in frequency and phase all the remote-control signals propagated by the respective driver means, said generating means comprising a stabilized oscillator coupled to an amplifier and forming a synchronizing device setting up a reference frequency, said device being associated with one of the controlling circuits and including a high frequency carrier current generator modulated by the reference frequency set up by the stabilized oscillator, said modulated high frequency current generator being coupled directly to said high tension line and delivering said modulated high frequency current thereto, and said receiver means being coupled to said line to receive the modulated high frequency current and including demodulation means connected to each of the other controlling circuits of the equipment and delivering thereto synchronized signals simultaneously controlling each remote-control driver means in the other meshes of the consumer network.

3. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal generating means, signal driver and propagating means connected in series in each of the meshes of the distribution network on the secondary side of each step-down transformer, a controlling circuit associated with each driver means and connected with a receiver means for controlling the propagation of remote-control signals in the associated mesh in response to received signals for synchronizing in frequency and phase all the remote-control signals propagated by the respective driver means, said generating means comprising a stabilized oscillator coupled to an amplifier and forming a synchronizing device setting up a reference frequency, said device being associated with one of the controlling circuits and with a radio transmitter emitting synchronizing signals at the reference frequency, and each receiver means receiving the radio signals emitted by the transmitter and including circuit means recovering the synchronizing signals and connected to each of the other controlling circuits for simultaneously controlling each remote-control driver means in the meshes of the consumer network.

4. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal generating means, signal driver and propagating means connected in series in each of the meshes of the distribution network on the secondary side of each step-down transformer, a controlling circuit associated with each driver means and connected with a receiver means for controlling the propagation of remote-control signals in the associated mesh in response to received signals for synchronizing in frequency and phase all the remote-control signals propagated by the various driver means, said generating means comprising a stabilized oscillator coupled to an amplifier and forming a synchronizing device setting up a reference frequency associated with one of the controlling circuits of the system, at least one cable connecting the amplifier associated with the stabilized transmitter to each of the other controlling circuits so as to apply the reference frequency to each of these controlling circuits, said reference synchronizing the propagation of each remote-control driver means in the meshes of the consumer network.

5. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal generating means, signal driver and propagating means connected in series in each of the meshes of the distribution network on the secondary side of each step-down transformer, a controlling circuit associated with each driver means and connected with a receiver means for controlling the propagation of remote-control signals in the associated mesh in response to received signals for synchronizing in frequency and phase all the remote-control signals propagated by the various driver means, said generating means comprising a vibrating reed-stabilized oscillator coupled to an amplifier forming a synchronizing device setting up a fixed frequency of sinusoidal current forming a reference frequency signal associated with one of the controlling circuits, a high frequency carrier generator and modulation means coupled with said amplifier and said generator delivering a carrier signal modulated with the reference frequency set up by the stabilized oscillator, an electric coupling condenser connecting the modulated generator output to the high tension line, demodulating and filtering devices at each receiver means comprising a transformer connected with a rectifying bridge and a resistance capacity filtering circuit and electrically connected by isolation condensers with said high tension line similarly coupled with each of the other controlling circuits of the equipment so that the fixed frequency sinusoidal reference current is simultaneously applied on all the receiver circuits of the equipment to simultaneously control each remote-control driver means in the meshes of the consumer network.

6. In an electric lattice network comprising at least one high tension line, step-down transformers with their primary coils connected to the high tension line, groups of supply bars having at least two bars in each group connected respectively to the secondary coils of an associated step-down transformer and including a consumer network of at least two conductors respectively connected to the supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising at each location a transformer having an output winding connected in series with one of the secondary windings of a step-down transformer in each of the meshes of said consumer network and having an input winding connected to driver means delivering an alternating current at a remote-control signal frequency, a control circuit for each driver means for controlling the power delivered thereby to the transformer, a locking circuit associated with each driver means and with a receiver means for controlling the alternating current in response to transmitted reference signals for synchronizing the frequency and phase of the alternating current propagated by all driver means, a synchronizing device setting up said signal frequency and located at one of the controlling circuits, said transmitter means transmitting the signal frequency and driven by said synchronizing device, and said receiver means being coupled to the respective other controlling circuits for receiving and locally propagating the alternating current synchronized with the reference frequency coming from the synchronizing device.

7. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising at each location a transformer having an output winding connected in series with one of the secondary windings of a step-down transformer in each of the meshes of said consumer network and having an input winding to driver means delivering an alternating current at remote-control signal frequency, a control circuit for each driver means for controlling the power delivered thereby to the transformer, a locking circuit associated with each driver means and with a receiver means for controlling the alternating current in response to transmitted reference for synchronizing the frequency and phase of the alternating current propagated by all driver means, a stabilized oscillator coupled to an amplifier and forming a synchronizing device setting up a reference frequency, this device being associated with one of the controlling circuits, a high frequency carrier generator and modulation means coupled with said amplifier and said generator delivering a carrier signal modulated with said reference frequency, coupling means connecting said modulated signal to said high tension line, and said receiver means detecting the modulated high frequency current from the high tension line and delivering the reference signal to each of the other controlling circuits of the system, said controlling circuits simultaneously synchronizing alternating current from all of the driver means in all the meshes of the consumer network.

8. In an electric lattice network comprising at least one high tension line, step-down transformers with their primary coils connected to the high tension line, groups of supply bars having at least two bars in each group connected to the respective secondary coils of an associated step-down transformer and including a consumer network of at least two conductors respectively connected to supply bars of each group and thereby defining interconnected closed meshes, a control system including transmitter and receiver means for transmitting mutually synchronized remote-control signals to actuate remote units connected to said consumer network at a plurality of locations coupled to different supply bars, said system comprising remote-control signal transmitting means, current propagating means respectively connected in series in each of the meshes of the consumer network on the secondary side of each step-down transformer, a stabilized oscillator coupled to an amplifier forming a remote-control and synchronizing signal generating device producing a sinusoidal alternating current of fixed frequency and coupled to said transmitting means, receiving means sensitive to the alternating current frequency and associated with each of the propagating means for thereby propagating remote-control signals into the meshes, said receiving means comprising an amplitude clipper limiting the sinusoidal current of the reference frequency, a pulse-shaping circuit connected to the clipper and supplying a current of differentiated wave shape comprising steep-front remote-control signal pulses of the same frequency as the sinusoidal alternating current and driving said current propagating means synchronously in all meshes.

9. An electric network control system as defined in claim 8, including modulator means connecting the amplifier delivering the reference sinusoidal current to said control signal transmitting means for modulating the carrier current thereof, propagating means connecting the transmitting means to one of the meshes of the consumer network, coupling means connecting the transmitting means carrier current to the high tension line, the receiving means being coupled to line to receive the reference frequency and demodulate it to produce an alternating current synchronized in phase and frequency with the reference frequency coming from said amplifier, amplifier means amplifying the derived reference frequency current so as to obtain at the output of the amplifier means an alternating current exactly similar to that coming from the amplifier associated with the stabilized oscillator for controlling said propagating means.

10. In an electric network comprising high tension lines, step-down transformers connected to said high tension lines and a multiphase consumer network of the lattice type supplied by said step-down transformer, a control system including transmitting and receiving means for transmitting synchronized remote-control signals to actuate remote units connected to each phase of said consumer network, said system comprising remote-control signal propagating means connected in series with each of the phases of each of the meshes of the consumer network, control means for forming control current pulses for each one of said propagating means, a phasing bridge having an output connected with each mesh of the consumer network and said phasing bridges connecting all of said control means in each phase of one mesh to a receiving means, a synchronizing signal generating means setting up a reference frequency directly connected to one of said phasing bridges and to phase-translating means connecting said synchronizing signal generating means to the other phasing bridges so that the reference frequency is transmitted in phase and frequency synchronism to all phasing bridges to cause operation in frequency synchronism but with phase-shifts proportional to the number of phases of said consumer network.

11. A system as set forth in claim 6, in which said driver control circuit comprises a gas tube connected to regulate the output power of said driver means, said gas tube being coupled for regulation with a controlling circuit having a saturable reactance, the saturation of which is determined by a differential current generated in a comparison circuit having a fixed voltage source coupled in opposition with an electrical voltage representative of the load in the consumer network.

12. A system as set forth in claim 6, in which said driver control circuit comprises a gas tube connected to regulate the output power of said driver means, said gas tube being coupled for regulation with a controlling circuit having a saturable reactance, the saturation of which is controlled by a transformer coupled into said consumer network to sample the current therein according to the variation of load on said network thus causing modification of the saturation of said reactance to regulate the output power of said gas tube regulating said driver.

References Cited in the file of this patent

UNITED STATES PATENTS 2,050,665 Mathews et al. ---------- Aug. 11, 1936